United States Patent
Shimada et al.

(10) Patent No.: US 11,945,177 B2
(45) Date of Patent: Apr. 2, 2024

(54) METHOD OF MANUFACTURING INTERMEDIATE PRODUCT OF AIRCRAFT PART AND AIRCRAFT PART

(71) Applicant: Kawasaki Jukogyo Kabushiki Kaisha, Kobe (JP)

(72) Inventors: Naoki Shimada, Kobe (JP); Yoshihiro Nakayama, Kobe (JP); Sayaka Ochi, Kobe (JP); Shouhei Kanazawa, Kobe (JP); Kenshirou Okumura, Kobe (JP); Takaya Hamamoto, Kobe (JP); Kentaro Tanaka, Kobe (JP); Yuya Ouchi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/839,558

(22) Filed: Jun. 14, 2022

(65) Prior Publication Data
US 2022/0305742 A1     Sep. 29, 2022

Related U.S. Application Data

(63) Continuation of application No. PCT/JP2021/010191, filed on Mar. 12, 2021.

(30) Foreign Application Priority Data

Mar. 31, 2020    (JP) ................................ 2020-062398

(51) Int. Cl.
*B29C 70/46*     (2006.01)
*B29C 70/16*     (2006.01)
(Continued)

(52) U.S. Cl.
CPC .............. *B29C 70/46* (2013.01); *B29C 70/16* (2013.01); *B64C 1/06* (2013.01); *B29K 2105/089* (2013.01); *B29L 2031/3076* (2013.01)

(58) Field of Classification Search
CPC ....... B29C 70/46; B29C 70/16; B29C 70/461; B29C 70/545; B29C 70/56;
(Continued)

(56) References Cited

U.S. PATENT DOCUMENTS

| | | | |
|---|---|---|---|
| 10,399,283 | B2 | 9/2019 | Offensend et al. |
| 2010/0285265 | A1 | 11/2010 | Shinoda et al. |

(Continued)

FOREIGN PATENT DOCUMENTS

| | | |
|---|---|---|
| EP | 3892549 A1 | 10/2021 |
| JP | 2010-150685 A | 7/2010 |
| JP | 2016-510701 A | 4/2016 |

OTHER PUBLICATIONS

Extended European search report dated May 10, 2023, in corresponding European patent Application No. 21779963.4, 8 pages.

*Primary Examiner* — Brian Handville
(74) *Attorney, Agent, or Firm* — XSENSUS LLP

(57) ABSTRACT

A first laminated body is worked to form a second laminated body, the first laminated body being formed by laminating prepregs including reinforcing fibers and resin, the second laminated body including a flat portion and a wavy portion, the flat portion being located at at least one of side edge portions of the second laminated body, the wavy portion being located at a portion adjacent to the side edge portion and extending along a longitudinal direction. An intermediate product is formed from the second laminated body by a forming die such that the flat portion becomes a bent portion that is an inside portion whose circumferential length is shorter in a curved portion, and the wavy portion becomes (Continued)

a bent portion that is an outside portion whose circumferential length is longer in the curved portion.

18 Claims, 4 Drawing Sheets

(51) Int. Cl.
*B64C 1/06* (2006.01)
*B29K 105/08* (2006.01)
*B29L 31/30* (2006.01)

(58) Field of Classification Search
CPC ... B29C 2793/009; B29C 70/30; B29C 70/54; B64C 1/06; B64C 1/061; B64C 2001/0072; B64C 1/064; B29K 2105/089; B29L 2031/3076; B64F 5/10; Y02T 50/40; B29D 99/0003
See application file for complete search history.

(56) References Cited

U.S. PATENT DOCUMENTS

2014/0255646 A1 9/2014 Griess et al.
2017/0095983 A1* 4/2017 Offensend ............... B29C 70/56
2018/0304559 A1 10/2018 Groetzschel

* cited by examiner

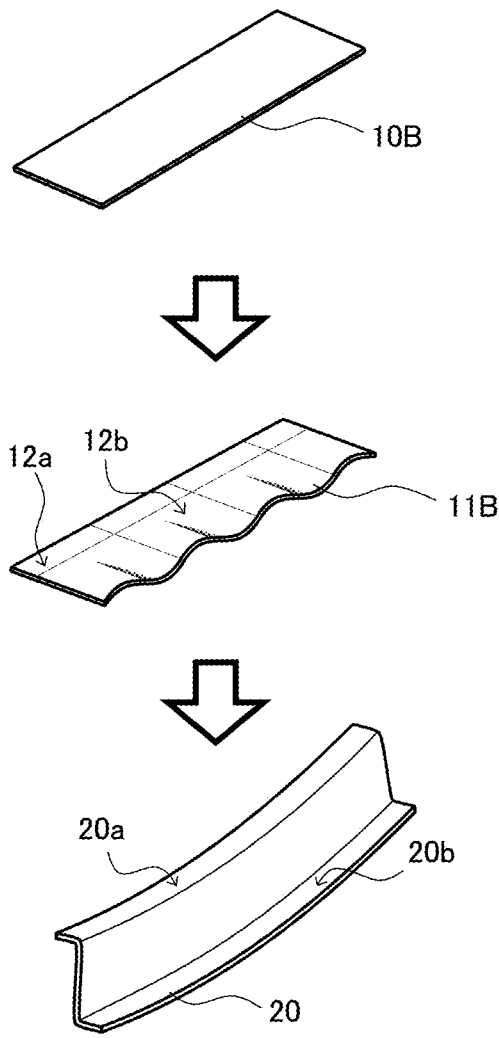

METHOD OF MANUFACTURING INTERMEDIATE PRODUCT OF AIRCRAFT PART AND AIRCRAFT PART

CROSS-REFERENCE TO RELATED APPLICATIONS

The present application is bypass continuation of PCT filing PCT/JP2021/010191, filed Mar. 12, 2021, which claims priority to JP 2020-062398, filed Mar. 31, 2020, both of which are incorporated by reference in their entirely.

BACKGROUND OF THE INVENTION

1. Field of the Invention

The present invention relates to a method of manufacturing an intermediate product of an aircraft part using a composite material, and an aircraft part.

2. Description of the Related Art

For example, Japanese Laid-Open Patent Application Publication No. 2010-150685 (JP 2010-150685 A) discloses a fiber reinforced resin composite material in which a reinforcing fiber base material itself is formed in a curved shape. A planar shape of the reinforcing fiber base material described in JP 2010-150685 A is a curved shape, and reinforcing fiber yarns are arranged in parallel with a direction along a circumferential direction of the curved shape. Then, auxiliary yarns that are weft are arranged in a direction intersecting with the reinforcing fiber yarns arranged in one direction along the circumferential direction. With this, JP 2010-150685 A describes that an elongated, curved fiber reinforced composite material applicable to, for example, a body frame of an aircraft can be mass-produced at low cost.

SUMMARY OF THE INVENTION

A method of manufacturing an intermediate product of an aircraft part according to the present disclosure is a method of manufacturing an intermediate product of an elongated aircraft part, the aircraft part including a curved portion and bent portions, the curved portion being curved in a longitudinal direction of the aircraft part, the bent portions being formed at respective side edge portions of the aircraft part, the method including: working a first laminated body to form a second laminated body, the first laminated body being formed by laminating prepregs including reinforcing fibers and resin, the second laminated body including a flat portion and a wavy portion, the flat portion being located at at least one of side edge portions of the second laminated body, the wavy portion being located at a portion adjacent to the side edge portion and extending along the longitudinal direction; and forming the intermediate product from the second laminated body by a forming die such that the flat portion becomes the bent portion that is an inside portion whose circumferential length is shorter in the curved portion, and the wavy portion becomes the bent portion that is an outside portion whose circumferential length is longer in the curved portion.

Moreover, an aircraft part according to the present disclosure is an elongated aircraft part formed from a laminated body, the laminated body being formed by laminating prepregs including reinforcing fibers and resin, the laminated body including a continuous fiber and a slit, the aircraft part including: a curved portion that is curved in a longitudinal direction of the aircraft part; and bent portions respectively located at an inner portion, having a shorter circumferential length, of the curved portion and an outer portion, having a longer circumferential length, of the curved portion, wherein: the curved portion and the bent portions include the laminated body; and the continuous fiber is arranged inside the bent portion, and the slit is arranged outside the bent portion.

BRIEF DESCRIPTION OF DRAWINGS

FIG. 2 is a schematic diagram showing another example of the manufacturing steps shown in FIG. 1.

DESCRIPTION OF THE PREFERRED EMBODIMENTS

In recent years, fiber reinforced resin composite materials (hereinafter suitably abbreviated as "composite materials") are widely used in fields in which metal materials have been used. Among the composite materials, CFRP which is formed by using carbon fibers as reinforcing fibers and impregnating the carbon fibers with matrix resin such as epoxy resin is smaller in weight and higher in strength than the metal material. Examples of composite-material parts used in aircrafts include: large structural parts such as wings and bodies; and elongated parts such as beams, stringers, and frames.

The elongated part for the aircraft may have such a shape as to be bent in a longitudinal direction and include a side edge portion that is bent. For example, a Z-shaped frame has a Z-shaped transverse section and includes curved flange portions which are an inside portion whose circumferential length is shorter and an outside portion whose circumferential length is longer and are formed by bending both side edge portions. Herein, directions in which the flange portions are bent are opposite to each other. On the other hand, directions in which flange portions of a C-shaped frame are bent are the same as each other. Examples of the elongated parts for the aircrafts include not only the Z-shaped frames and the C-shaped frames but also Ω-shaped frames having Ω-shaped (or hat-shaped) transverse sections.

To form such elongated part, generally, prepregs are manually laminated on each other to form a laminated body including a curved structure and bent portions, and the laminated body is subjected to autoclave molding. Each prepreg is formed by impregnating reinforcing fibers that are continuous fibers with matrix resin and semi-curing them. Manually laminating the prepregs on each other significantly deteriorates efficiency of forming a part.

Especially, to secure a strength property, the reinforcing fibers need to be accurately laminated such that orientation angles of the reinforcing fibers fall within a tolerance required in drawings. Moreover, to secure the appearance of the part or the internal quality of the part, a stretched state, a loose state, or the like of the laminated reinforcing fibers need to be prevented. However, when the prepregs are laminated on a forming die including a curved structure and bent portions, the fiber orientation angles of the reinforcing fibers may become inappropriate, or the stretched state or the loose state of the reinforcing fibers may occur.

The manufacturing method of the present disclosure was made to solve the above problems and can efficiently manufacture an aircraft part including a curved structure and bent portions even by using general reinforcing fibers.

Schematic Configuration of Aircraft Part

Figure 1:
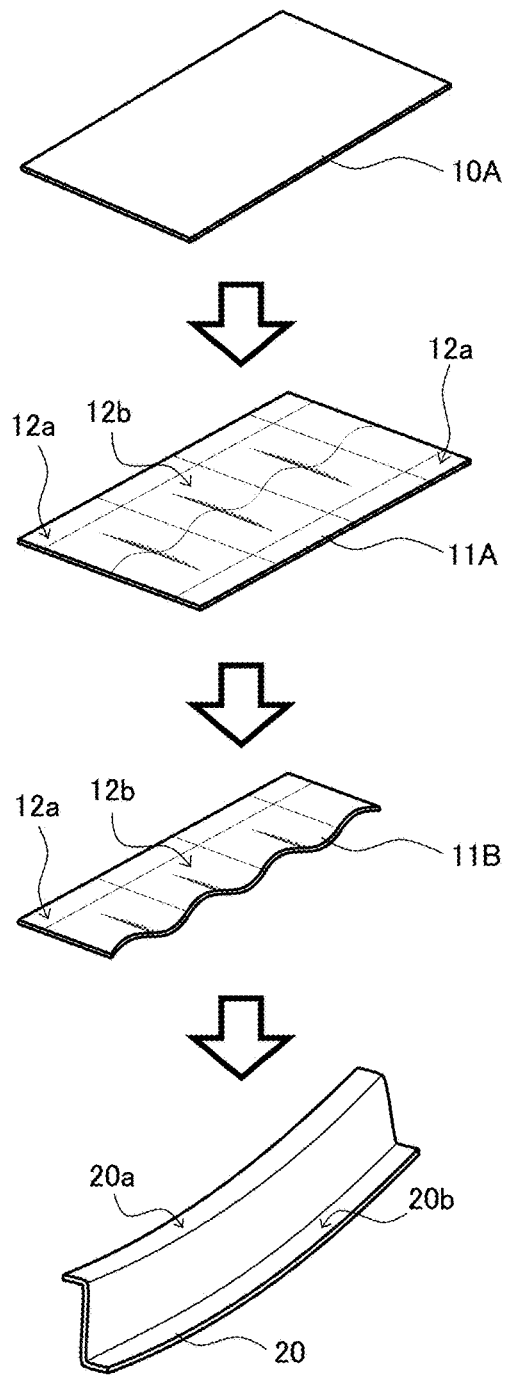
FIG. 1 is a schematic diagram showing manufacturing steps of an intermediate product of an aircraft part according to an embodiment.

As shown in FIGS. 1 and 2, an intermediate product 20 of the aircraft part of the present disclosure is an elongated parts formed from a flat laminated body in which prepregs including reinforcing fibers and resin are laminated on each other, the elongated parts being curved in a longitudinal direction and having, for example, a Z-shaped transverse section.

A laminated structure is such a structure that composite material layers are laminated, the composite material layers being the prepregs including reinforcing fibers and resin composition. The laminated structure is formed in the entire aircraft part including the curved structure and the bent portions.

The intermediate product 20 has a Z-shaped section and includes a plate-shaped main body (also called a "web") and two flange portions 20a and 20b. The two flange portions 20a and 20b are bend in opposite directions from both side edge portions of the plate-shaped main body.

Laminated Body

Examples of the reinforcing fibers include carbon fibers, polyester fibers, PBO (polyparaphenylene benzobisoxazole) fibers, boron fibers, aramid fibers, glass fibers, silica fibers (quartz fibers), silicon carbide (SiC) fibers, and nylon fibers. These reinforcing fibers may be used alone or in combination of two types or more. The reinforcing fibers of the present disclosure are, for example, carbon fibers and are used as a base material constituted by braid fabric, woven fabric, knit fabric, nonwoven fabric or the like.

Moreover, the resin composition with which the reinforcing fibers are impregnated is, for example, thermosetting resin or thermoplastic resin.

Examples of the thermosetting resin include epoxy resin, polyester resin, vinyl ester resin, phenol resin, cyanate ester resin, polyimide resin, polyamide resin, and the like. These thermosetting resins may be used alone or in combination of plural types. Moreover, regarding a chemical structure of the thermosetting resin, the thermosetting resin may be a polymer formed by polymerizing known various monomers or may be a copolymer formed by polymerizing monomers. Moreover, an average molecular weight, structures of a main chain and a side chain, and the like are not especially limited.

Examples of the thermoplastic resin include engineering plastic, such as polyphenylene sulfide (PPS), polyether ether ketone (PEEK), and polyether imide (PEI). Regarding a chemical structure of the thermoplastic resin, the thermoplastic resin may be a polymer formed by polymerizing known various monomers or may be a copolymer formed by polymerizing monomers. Moreover, an average molecular weight, structures of a main chain and a side chain, and the like are not especially limited.

The matrix material may be constituted only by the thermosetting resin or the thermoplastic resin. However, the matrix material may include known curing agents, known curing accelerators, known reinforcing materials and fillers other than the fiber base material, and other known additives.

As above, the composite material of the present disclosure may be a "thermosetting" material constituted by the reinforcing fibers and the thermosetting resin or by the reinforcing fibers and the thermosetting resin composition or may be a "thermoplastic" material constituted by the reinforcing fibers and the thermoplastic resin or by the reinforcing fibers and the thermoplastic resin composition.

In the aircraft part of the present disclosure, the laminated body formed by laminating the prepregs is used, the prepregs being sheet bodies each formed such that the base material constituted by the reinforcing fibers is impregnated with the thermosetting resin composition or the thermoplastic resin composition and is then semi-cured.

As shown in uppermost stages of FIGS. 1 and 2, first laminated bodies 10A and 10B are elongated and flat.

Method of Manufacturing Aircraft Part Using Conventional Art

When manufacturing the aircraft part by a conventionally general manufacturing method, first, a flat plate-shaped prepreg laminated body is prepared by laminating the prepregs. At this time, to avoid a case where the fiber orientation angles of the reinforcing fibers may become inappropriate and a case where the stretched state or the loose state of the reinforcing fibers occurs, the prepreg laminated body is manually laminated while considering the curved structure. Next, the prepreg laminated body is placed on a jig used to form the curved structure and the Z shape and is subjected to hot drape forming in which heated and pressurized under such a condition that the resin composition is not cured but flows. With this, the prepreg laminated body that is curved in the longitudinal direction and has a Z-shaped section is obtained.

After that, by using a heat resistant film, a seal material, and the like, the prepreg laminated body is subjected to bagging together with a male jig and is then subjected to autoclave molding. Since the prepreg laminated body is heated and pressurized by the autoclave molding, the prepreg laminated body is cured while maintaining the curved structure and the Z-shaped section, and thus, the cured object, i.e., the aircraft part is obtained.

After the autoclave molding is terminated, the male jig and the aircraft part in the bagged state are subjected to debagging, and with this, the aircraft part is separated from the male jig. In the autoclave molding, residuals are generated around the cured object since the resin composition flows out and is then cured. Therefore, to remove the residuals, the cured object is subjected to trimming. After the trimming, the cured object is subjected to perforating. After that, the cured object is subjected to nondestructive inspection (NDI). In the NDI, the presence or absence of flaws which influence (or may influence) the quality of the cured object is inspected. Examples of the flaws include delamination, void, and porosity. After the NDI, the cured object is subjected to edge sealing. By the edge sealing, moisture absorption from the fibers exposed at trim edges by the trimming can be prevented, and electrocorrosion through the exposed fibers can also be prevented.

Method of Producing Intermediate Product of Aircraft Part of Present Disclosure

As shown in FIGS. 1 and 2, according to the manufacturing method of the present disclosure, the first laminated bodies 10A and 10B each formed by laminating the prepregs are subjected to preforming. Thus, second laminated bodies 11A and 11B including flat portions 12a and wavy portions 12b are formed. Next, the intermediate products 20 (also called "Z-shaped frames") of the aircraft parts are obtained from the second laminated bodies 11A and 11B by a method, such as autoclave molding, hot pressing forming, hot drape forming, spinning forming, an air pushing method, or other method. Hereinafter, details of the manufacturing methods of FIGS. 1 and 2 will be described.

First, as shown in an upper stage of FIG. 1, the flat-plate first laminated body 10A that is the elongated, is prepared.

Next, the second laminated body 11A is formed such that: both side edge portions of the flat-plate first laminated body 10A are maintained as the flat portions 12a; and the wavy portion 12b is formed so as to include convex portions and concave portions at a portion adjacent to the flat portions 12a. The wavy portion 12b is obtained by, for example, preparing a preforming die and subjecting the first laminated body 10A, 10B to the preforming.

When the first laminated body 10A is formed in a curved shape in the longitudinal direction, the wavy portion 12b becomes a portion corresponding to the outside portion whose circumferential length is longer. Therefore, the wavy portion 12b is extended in the longitudinal direction in advance. The degree of extension of the wavy portion 12b is preferred to be 40% or less of the wavy portion 12b that has not yet been extended and may be 30% or less or 10% or less. In other words, when an entire length of the wavy portion 12b of the wavy-plate laminated body 11A, 11B in the longitudinal direction before the convex portions and the concave portions are formed is regarded as 100%, the entire length of the wavy portion 12b is preferred to fall within a range of more than 100% and 140% or less or may fall within a range of more than 100% and 130% or less or a range of more than 100% and 110% or less.

At the wavy portion 12b, the reinforcing fibers that are easily extended are arranged. Examples of the reinforcing fibers that are easily extended include discontinuous reinforcing fibers and reinforcing fibers including slits. On the other hand, continuous fibers are arranged at the flat portions 12a.

In FIG. 1, with both side edge portions of the first laminated body 10A fixed, the convex portions and the concave portions are formed at a portion between both side edge portions. With this, the flat portions 12a and the wavy portion 12b are formed. By cutting the obtained second laminated body 11A at a width direction middle portion along the longitudinal direction, two second laminated bodies 11B in each of which one side edge thereof is the flat portion 12a and the other side edge thereof is the wavy portion 12b can be obtained.

Or, as shown in FIG. 2, with one side edge portion of the first laminated body 10B fixed, the wavy portion 12b including the convex portions and the concave portions along the longitudinal direction may be formed at a portion adjacent to the side edge portion. Thus, the second laminated body 11B may be directly obtained.

Finally, the intermediate product 20 of the aircraft part is obtained by subjecting the obtained second laminated body 11A, 11B to autoclave molding, hot pressing forming, hot drape forming, spinning forming, an air pushing method, or the like.

Next, steps of forming the intermediate product 20 of the aircraft part from the second laminated body 11B will be described with reference to FIGS. 3A to 3F. In the present embodiment, the Z-shaped frame 20 is formed by holing the wavy-plate laminated body 11B with a blank holder instead of performing forming by holding the prepreg laminated body by a clip method that is general in the press-forming.

According to the clip method, a portion held by a clip part is removed as an unnecessary portion by, for example, trimming. Therefore, the portion of the prepreg laminated body held in the clip method does not become part of a formed object.

On the other hand, generally, the blank holder is used to suppress the generation of wrinkles at a flange portion of a spinning formed object. Therefore, the portion of the prepreg laminated body held by the blank holder constitutes part of a formed object.

As shown in FIGS. 3A to 3F, a forming die includes a holder portion 31, a main body portion 32, a support portion 33, and a drape portion 34. The holder portion 31 and the drape portion 34 are arranged at an upper side of the forming die so as to be movable upward and downward (i.e., so as to be able to advance and retreat). Moreover, the drape portion 34 can approach or separate from the main body portion 32 independently from the holder portion 31. the forming die includes a preheater used to form the second laminated body 11B.

The main body portion 32 includes a first upper forming surface, a second upper forming surface, and a vertical forming surface connecting the first upper forming surface and the second upper forming surface. The first upper forming surface is opposed to the holder portion 31 and is located higher than the second upper forming surface. The second upper forming surface is located lower than the first upper forming surface. The vertical forming surface extends in an upper-lower direction (vertical direction) and connects the first upper forming surface and the second upper forming surface.

The prepreg laminated body can be formed to have a Z-shaped section by three surfaces that are the first upper forming surface, the vertical forming surface, and the second upper forming surface. The first upper forming surface forms a surface of the inner flange portion 20a of the intermediate product 20. The second upper forming surface forms a surface of the outer flange portion 20b of the intermediate product 20. The vertical forming surface forms the plate-shaped main body of the intermediate product 20.

The holder portion 31 moves upward and downward (advances and retreats) with respect to the first upper forming surface of the main body portion 32. The support portion 33 approaches or separates from the vertical forming surface of the main body portion 32. Moreover, when the support portion 33 is in contact with the vertical forming surface of the main body portion 32, an upper surface of the support portion 33 and the first upper forming surface of the main body portion 32 are substantially flush with each other. In FIGS. 3A to 3F, when the support portion 33 is in contact with the vertical forming surface, a lower surface of the support portion 33 is in contact with the second upper forming surface of the main body portion 32. However, a gap may be formed between the lower surface of the support portion 33 and the second upper forming surface.

Figure 3A:
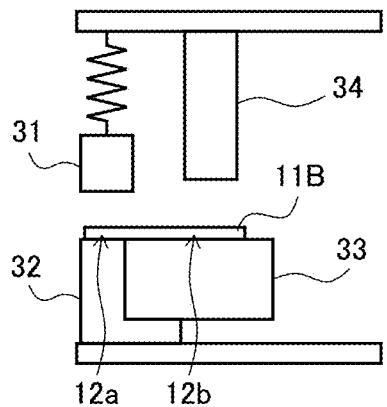
FIGS. 3A to 3F are schematic diagrams showing steps of forming the intermediate product from a second laminated body.

Next, steps of forming the intermediate product 20 from the second laminated body 11B will be described. First, as shown in FIG. 3A, the support portion 33 is in contact with the main body portion 32, and the second laminated body 11B is placed on the upper surfaces of the main body portion 32 and the support portion 33. At this time, the flat portion 12a of the second laminated body 11B is placed on the first upper forming surface of the main body portion 32, and the wavy portion 12b is placed on the upper surface of the support portion 33. Moreover, the holder portion 31 and the drape portion 34 stand by at positions upwardly away from the main body portion 32 and the support portion 33. At this time, the drape portion 34 is located at a position away from the holder portion 31 and the main body portion 32.

Figure 3D:
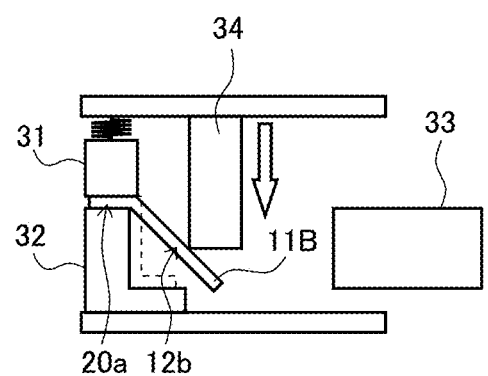
Figure 3B:
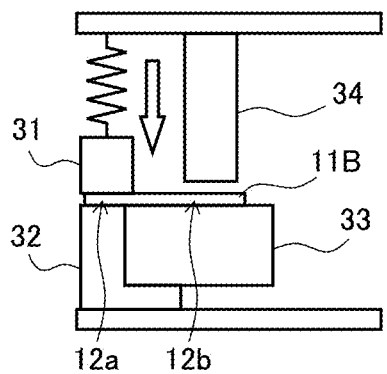

Next, as shown in FIG. 3B, the holder portion 31 moves downward (as shown by a block arrow in FIG. 3B) and presses the flat portion 12a of the second laminated body 11B from above. With this, as shown in FIG. 3C, the flat portion 12a of the second laminated body 11B is held by the holder portion 31 and the main body portion 32, and thus, the inner flange portion 20a is formed.

Figure 3E:
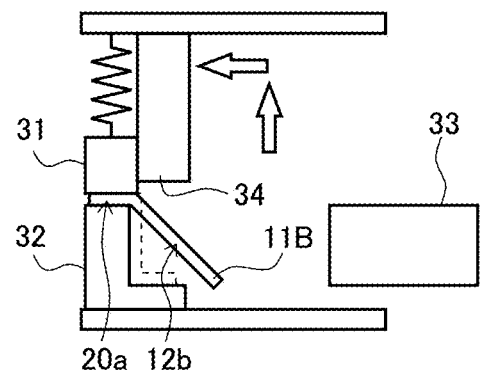
Figure 3C:
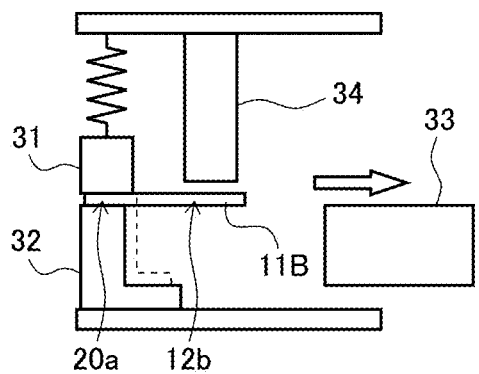

Next, as shown in FIG. 3C, with the second laminated body 11B held by the holder portion 31 and the main body portion 32, the support portion 33 moves forward so as to separate from the main body portion 32 (as shown by a block arrow in FIG. 3C). In this state, a space is formed between the second upper forming surface and the second laminated body 11B in a held state.

Next, as shown in FIG. 3D, the drape portion 34 moves downward (as shown by a block arrow in FIG. 3D) and presses the wavy portion 12b of the second laminated body 11B downward. At this time, the second laminated body 11B is being heated by the preheater, and when the wavy portion 12b is pressed downward by the drape portion 34 with the inner flange portion 20a held by the blank holder, the wavy portion 12b is bent downward with respect to the inner flange portion 20a. In FIG. 3D, since the holder portion 31 moves downward together with the drape portion 34, the holder portion 31 more strongly holds the inner flange portion 20a.

When the wavy portion 12b is bent, a portion outside the bent portion becomes an "extended portion" where the second laminated body 11B is extended, and a portion inside the bent portion becomes a "non-extended portion" where the second laminated body 11B is not extended. At the "non-extended portion," continuous fibers not including slits are arranged as the reinforcing fibers. With this, required strength of the aircraft part can be obtained.

When the second laminated body 11B is preheated, flexibility thereof improves, and the plastic deformation of the resin composition and the reinforcing fibers easily occurs. Therefore, when the second laminated body 11B is held by the holder portion 31 and the main body portion 32 and is pressed down and bent by the drape portion 34, plastic working is easily performed. As above, at the time of forming processing by the forming die, hot plastic working of the second laminated body 11B by preheating is performed.

Next, as shown in FIG. 3E, with the wavy portion 12b in a bent state, the drape portion 34 and the holder portion 31 move upward once (as shown by an up block arrow in FIG. 3E). At this time, the holder portion 31 maintains a state of pressing the inner flange portion 20a. After that, only the drape portion 34 moves so as to approach the holder portion 31 (as shown by a lateral block arrow in FIG. 3E). Finally, the drape portion 34 reaches a position right above the second upper forming surface of the main body portion 32.

Figure 3F:
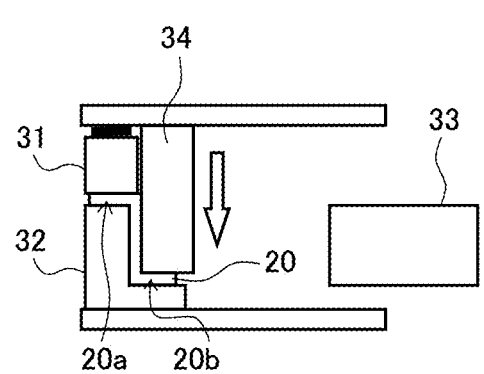

Finally, as shown in FIG. 3F, when the drape portion 34 and the holder portion 31 move downward (as shown by a block arrow in FIG. 3F), the inner flange portion 20a of the second laminated body 11B is further strongly pressed by the holder portion 31, and the wavy portion 12b of the second laminated body 11B is pressed by the drape portion 34 so as to extend along the vertical forming surface and the second upper forming surface of the main body portion 32. With this, in a state where the inner flange portion 20a is pressed by the blank holder so as not to be extended, the wavy portion 12b is bent and extended by the drape portion 34. As a result, the flat portion 12a of the second laminated body 11B becomes the inner flange portion 20a, and the wavy portion 12b becomes the plate-shaped main body and the outer flange portion 20b. Thus, the intermediate product 20 of the aircraft part having a Z-shaped section is formed.

Figure 4A:
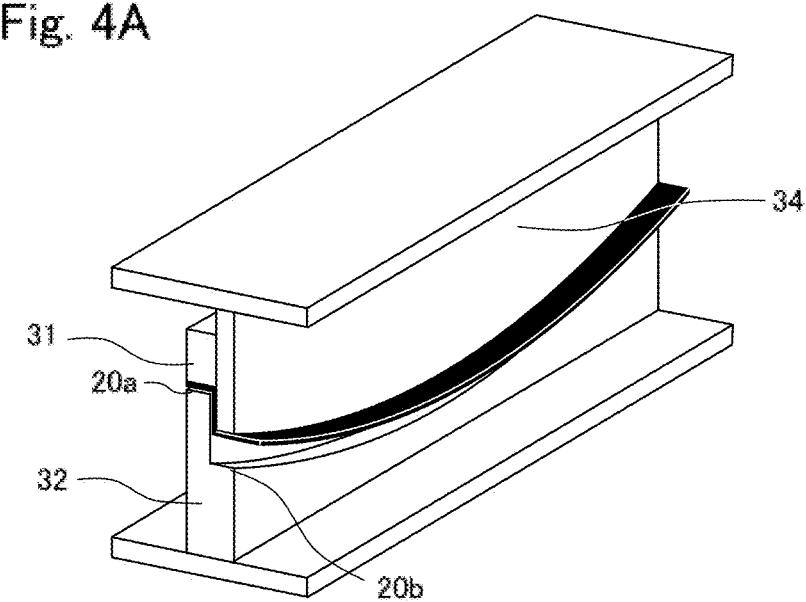
FIGS. 4A and 4B are perspective views of a forming die.
Figure 4B:
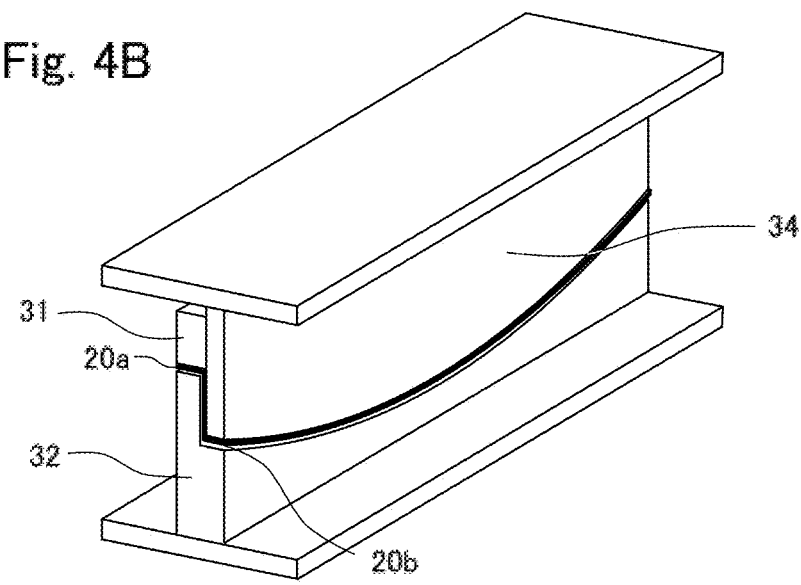

FIGS. 4A and 4B are perspective views showing the forming die. FIG. 4A corresponds to the steps shown in FIGS. 3E and 3F and shows that the drape portion 34 is moving downward. FIG. 4B corresponds to the step shown in FIG. 3F and shows that the downward movement of the drape portion 34 is completed, and the drape portion 34 is in contact with the second upper forming surface of the main body portion 32.

As shown in FIGS. 4A and 4B, the second upper forming surface of the main body portion 32 is curved in the longitudinal direction. Therefore, when the drape portion 34 moves downward, and the second laminated body 11B is pressed by the main body portion 32 and the drape portion 34, the intermediate product 20 having the curved portion and the Z-shaped section is obtained from the second laminated body 11B.

The obtained intermediate product 20 has a final shape of the aircraft part or a shape similar to the final shape. At this time, when the thermosetting resin is used in the first laminated body 10A, 10B, the intermediate product 20 obtained in FIG. 3F is heated and pressurized to cure the resin, and then, is subjected to outer periphery trimming and perforating. Thus, the final aircraft part is completed.

On the other hand, when the thermoplastic resin is used in the first laminated body 10A, 10B, the intermediate product 20 obtained in FIG. 3F is heated to be softened and is then pressurized. With this, interlayer adhesion is made strong and satisfactory. Then, the intermediate product 20 is subjected to outer periphery trimming and perforating. Thus, the final aircraft part is completed.

Through the above steps, the aircraft part can be obtained from the prepreg laminated body.

Modified Examples

The above-described steps do not necessarily have to be performed in the order shown in FIGS. 3A to 3F. For example, after the steps shown in FIGS. 3A and 3B are performed, the steps shown in FIGS. 3E and 3F may be performed without performing the steps shown in FIGS. 3C and 3D.

In the present embodiment, the sectional shape of the intermediate product 20 of the aircraft part is the Z shape. However, the present embodiment is not limited to this. The sectional shape of the intermediate product 20 of the aircraft part is not limited as long as the intermediate product 20 is curved in the longitudinal direction and includes the bent portions formed by bending both side edge portions. For example, the sectional shape of the intermediate product 20 of the aircraft part may have a C shape in which directions in which the flange portions 20a and 20b are bent are the same as each other. Or, the sectional shape of the intermediate product 20 of the aircraft part may have an Q shape (hat shape).

The prepreg laminated body is only required to be formed by laminating prepregs. The shape of the prepreg, the number of prepregs laminated, a direction in which the prepregs are laminated, and the like are not limited. The shape of the prepreg laminated body is not especially limited. The prepreg laminated body is only required to be the flat first laminated body 10A, 10B at the beginning of the manufacture, and the shape of the prepreg laminated body is not limited to a rectangular shape.

The prepreg may include a slit region including partial slits or may not include the slit region. In the prepreg laminated body, a single layer may be formed by joining prepregs having relatively small areas or may be a large prepreg not including a joint portion.

Moreover, the prepreg laminated body may include a material other than the composite material. For example, a resin layer made of resin having stretchability may be laminated on the surface of the prepreg laminated body. Or, the prepreg laminated body may include a metal mesh layer or metal foil having stretchability. For example, a copper mesh layer may be laminated on the surface of the prepreg laminated body. The aircraft part including the surface on which the copper mesh is formed can be obtained by subjecting the prepreg laminated body including the copper mesh layer to the heating-pressurizing forming. The aircraft part which can be protected from lightning can be obtained by the copper mesh layer.

A content rate of the reinforcing fiber is not especially limited. A fiber volume content rate Vf may fall within a range of 50% to 70%, preferably within a range of 55% to 65%. If the fiber volume content rate Vf is too low, the satisfactory physical property and the like of the aircraft part may not be realized. In contrast, if the fiber volume content rate Vf is too high, the amount of resin composition that is the matrix material becomes too small, and therefore, the resin composition cannot satisfactorily support the reinforcing fiber. In addition, if the fiber volume content rate Vf is too high, the amount of reinforcing fiber becomes relatively too large from the viewpoint of the entire elongated part made of the composite material, and therefore, the reinforcing fiber may not satisfactorily flow or stretch during the forming. The fiber volume content rate Vf is known in fields of carbon fiber reinforced plastic (CFRP) and the like and is an index indicating, as a volume ratio, the amount (content) of fiber contained in the entire composite material. A method of calculating the fiber volume content rate Vf is performed based on HS K7075 or ASTM D3171.

Specific shapes and dimensions of the convex and concave portions formed at the wavy portion 12b of the second laminated body 11B, the number of convex and concave portions, and the like are not especially limited. For example, these are set in accordance with the degree of extension of the wavy portion 12b, the degree of the curved structure of the aircraft part such as the Z-shaped frame 20, and the like. The present embodiment has described an example in which when portions projecting from the wavy-plate laminated bodies 11A and 11B are regarded as the convex portions, and portions projecting from the lower surfaces of the wavy-plate laminated bodies 11A and 11B are regarded as the concave portions, four convex portions and three concave portions are formed. However, the present embodiment is not limited to this.

When preforming the second laminated body 11B from the first laminated body 10A, 10B, the wavy portion 12b may be directly formed on the first laminated body 10A, 10B. Also, the first laminated body 10A, 10B may be subjected to preforming so as to have a predetermined curvature in advance. To be specific, the second laminated body 11B may be formed by forming the convex portions and the concave portions on the first laminated body 10A, 10B or may be formed by bending the first laminated body 10A, 10B in the longitudinal direction and then forming the convex portions and the concave portions.

The forming die of the present embodiment is one schematic example, and specific configurations of the holder portion 31, the main body portion 32, the support portion 33, and the drape portion 34 are not especially limited. Moreover, the forming die of the present embodiment may include a component other than the holder portion 31, the main body portion 32, the support portion 33, and the drape portion 34. Furthermore, specific configurations of movable components for the holder portion 31, the support portion 33, and the drape portion 34 that are movable portions of the forming die of the present embodiment, are not especially limited.

In the present embodiment, the continuous fibers are arranged at the "non-extended portion" that is a portion inside the bent portion when the wavy portion 12b is bent. However, the present embodiment is not limited to this. At the "non-extended portion," the reinforcing fiber including the slit region including partial slits may be arranged.

As above, a manufacturing method according to the present disclosure is a method of manufacturing an intermediate product of an elongated aircraft part, the aircraft part including a curved portion and bent portions, the curved portion being curved in a longitudinal direction of the aircraft part, the bent portions being formed at respective side edge portions of the aircraft part, the method including: working a first laminated body to form a second laminated body, the first laminated body being formed by laminating prepregs including reinforcing fibers and resin, the second laminated body including a flat portion and a wavy portion, the flat portion being located at at least one of side edge portions of the second laminated body, the wavy portion being located at a portion adjacent to the side edge portion and extending along the longitudinal direction; and forming the intermediate product from the second laminated body by a forming die such that the flat portion becomes the bent portion that is an inside portion whose circumferential length is shorter in the curved portion, and the wavy portion becomes the bent portion that is an outside portion whose circumferential length is longer in the curved portion.

According to this configuration, unlike conventional cases, the prepregs do not have to be laminated on each other with a high degree of accuracy. Therefore, the work efficiency improves, and the aircraft part which secures strength and quality and has the curved shape can be efficiently manufactured. Moreover, since it is unnecessary to use a special reinforcing fiber base material including auxiliary yarns, the aircraft part having the curved shape can be manufactured at low cost.

Moreover, the second laminated body is preheated to be formed as the intermediate product.

According to this configuration, the plastic deformation of the second laminated body including the flat portion and the wavy portion can be performed.

Moreover, when forming the second laminated body, the wavy portion is formed along the longitudinal direction at a portion between both side edge portions of the flat laminated body while maintaining the side edge portions of the flat laminated body as flat portions. The second laminated body is divided at a width direction middle portion of the second laminated body along the longitudinal direction to form a divided laminated body. The intermediate product is formed from the divided laminated body of the second laminated body by the forming die such that the flat portion becomes the bent portion that is the inside portion whose circumferential length is shorter in the curved portion, and the wavy portion becomes the bent portion that is the outside portion whose circumferential length is longer in the curved portion.

According to this configuration, since both side edge portions of the laminated body are the flat portions, and the wavy portion is formed at a portion between both side edge portions, the transformation of the prepregs of a peripheral portion of a width-direction center line of the laminated body becomes bilaterally symmetrical. Therefore, the aircraft part having stable quality after the forming can be obtained.

Moreover, the second laminated body is formed such that when an entire length of the flat portion in the longitudinal direction is regarded as 100%, an entire length of the wavy portion in the longitudinal direction falls within a range of more than 100% and 140% or less.

According to this configuration, the entire length of the wavy portion of the second laminated body can be made longer than the entire length of the flat portion. Even when the bent portions are formed, the curved aircraft part having adequate strength property can be manufactured.

When forming the intermediate product, the flat portion of the second laminated body is fixed by the forming die, and the wavy portion of the fixed second laminated body is bent by the forming die to form the bent portion.

According to this configuration, the intermediate product of the aircraft part including the curved portion and the bent portion can be obtained in a short period of time.

Moreover, the second laminated body includes a continuous fiber and a slit, and the intermediate product is formed from the second laminated body by the forming die such that a portion including the continuous fiber is located inside the bent portion, and a portion including the slit is located outside the bent portion.

According to this configuration, even when the bent portions are formed, the curved aircraft part having adequate strength property can be manufactured.

Moreover, the second laminated body is formed by the forming die to have a Z-shaped transverse section, a C-shaped transverse section, or an Ω-shaped transverse section.

According to this configuration, the curved aircraft part having adequate strength property can be manufactured.

An aircraft part of the present disclosure is an elongated aircraft part formed from a laminated body, the laminated body being formed by laminating prepregs including reinforcing fibers and resin, the laminated body including a continuous fiber and a slit, the aircraft part including: a curved portion that is curved in a longitudinal direction of the aircraft part; and bent portions respectively located at an inner portion, having a shorter circumferential length, of the curved portion and an outer portion, having a longer circumferential length, of the curved portion, wherein: the curved portion and the bent portions include the laminated body; and the continuous fiber is arranged inside the bent portion, and the slit is arranged outside the bent portion.

According to this configuration, the curved part having strength property, appearance, and internal forming quality that are required as the aircraft part can be realized.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

What is claimed is:

1. A method of manufacturing an intermediate product of an elongated aircraft part, the aircraft part including a curved portion and bent portions, the curved portion being curved in a longitudinal direction of the aircraft part, the bent portions being formed at respective side edge portions of the aircraft part, the method comprising:

working a first laminated body to form a second laminated body, the first laminated body being formed by laminating prepregs including reinforcing fibers and resin, the second laminated body including a flat portion and a wavy portion, the flat portion being located at at least one of side edge portions of the second laminated body, the wavy portion being located at a portion adjacent to the side edge portion and extending along the longitudinal direction; and forming the intermediate product from the second laminated body by a forming die such that the flat portion becomes the bent portion that is an inside portion whose circumferential length is shorter in the curved portion, and the wavy portion becomes the bent portion that is an outside portion whose circumferential length is longer in the curved portion.

2. The method according to claim 1, wherein the second laminated body is preheated to be formed as the intermediate product.

3. The method according to claim 1; comprising:
when working the second laminated body,
working the wavy portion along the longitudinal direction at a portion between both side edge portions of the second laminated body while maintaining the side edge portions of the second laminated body as flat portions;
dividing the second laminated body at a width direction middle portion of the second laminated body along the longitudinal direction to form a divided laminated body; and
forming the intermediate product from the divided laminated body of the second laminated body by the forming die such that the flat portion becomes the bent portion that is the inside portion whose circumferential length is shorter in the curved portion, and the wavy portion becomes the bent portion that is the outside portion whose circumferential length is longer in the curved portion.

4. The method according to claim 1, comprising
working the second laminated body such that when an entire length of the flat portion in the longitudinal direction is regarded as 100%, and an entire length of the wavy portion in the longitudinal direction falls within a range of more than 100% and 140% or less.

5. The method according to claim 1, comprising:
when forming the intermediate product,
fixing the flat portion of the second laminated body by the forming die; and
bending the wavy portion of the fixed second laminated body by the forming die to form the bent portion.

6. The method according to claim 5, wherein:
the second laminated body includes a continuous fiber and a slit; and
the intermediate product is formed from the second laminated body by the forming die such that a portion including the continuous fiber is located inside the bent portion, and a portion including the slit is located outside the bent portion.

7. The method according to claim 1, wherein the second laminated body is formed by the forming die to have a Z-shaped transverse section, a C-shaped transverse section, or an Ω-shaped transverse section.

8. The method according to claim 2, comprising:
when working the second laminated body,
working the wavy portion along the longitudinal direction at a portion between both side edge portions of the second laminated body while maintaining the side edge portions of the second laminated body as flat portions;

dividing the second laminated body at a width direction middle portion of the second laminated body along the longitudinal direction to form a divided laminated body; and forming the intermediate product from the divided laminated body of the second laminated body by the forming die such that the flat portion becomes the bent portion that is the inside portion whose circumferential length is shorter in the curved portion, and the wavy portion becomes the bent portion that is the outside portion whose circumferential length is longer in the curved portion.

9. The method according to claim 2, comprising working the second laminated body such that when an entire length of the flat portion in the longitudinal direction is regarded as 100%, and an entire length of the wavy portion in the longitudinal direction falls within a range of more than 100% and 140% or less.

10. The method according to claim 3, comprising working the second laminated body such that when an entire length of the flat portion in the longitudinal direction is regarded as 100%, and an entire length of the wavy portion in the longitudinal direction falls within a range of more than 100% and 140% or less.

11. The method according to claim 2, comprising:

when forming the intermediate product, fixing the flat portion of the second laminated body by the forming die; and bending the wavy portion of the fixed second laminated body by the forming die to form the bent portion.

12. The method according to claim 3, comprising:

when forming the intermediate product, fixing the flat portion of the second laminated body by the forming die; and bending the wavy portion of the fixed second laminated body by the forming die to form the bent portion.

13. The method according to claim 4, comprising:

when forming the intermediate product, fixing the flat portion of the second laminated body by the forming die; and bending the flat portion of the fixed second laminated body by the forming die to form the bent portion.

14. The method according to claim 2, wherein the second laminated body is formed by the forming die to have a Z-shaped transverse section, a C-shaped transverse section, or an Ω-shaped transverse section.

15. The method according to claim 3, wherein the second laminated body is formed by the forming die to have a Z-shaped transverse section, a C-shaped transverse section, or an Ω-shaped transverse section.

16. The method according to claim 4, wherein the second laminated body is formed by the forming die to have a Z-shaped transverse section, a C-shaped transverse section, or an Ω-shaped transverse section.

17. The method according to claim 5, wherein the second laminated body is formed by the forming die to have a Z-shaped transverse section, a C-shaped transverse section, or an Ω-shaped transverse section.

18. The method according to claim 6, wherein the second laminated body is formed by the forming die to have a Z-shaped transverse section, a C-shaped transverse section, or an Ω-shaped transverse section.

* * * * *